United States Patent
Honjo et al.

(10) Patent No.: US 6,913,737 B2
(45) Date of Patent: Jul. 5, 2005

(54) METHOD FOR THE TREATING IN EXHAUST GAS AND EXHAUST GAS TREATING SYSTEM

(75) Inventors: Shintaro Honjo, Hiroshima-ken (JP); Toru Takashina, Hiroshima-ken (JP); Eiji Ochi, Tokyo (JP)

(73) Assignee: Mitsubishi Heavy Industies, Ltd., Tokyo (JP)

( * ) Notice: Subject to any disclaimer, the term of this patent is extended or adjusted under 35 U.S.C. 154(b) by 304 days.

(21) Appl. No.: 10/362,518
(22) PCT Filed: Jul. 18, 2001
(86) PCT No.: PCT/JP01/06224
§ 371 (c)(1), (2), (4) Date: Mar. 3, 2003
(87) PCT Pub. No.: WO03/008072
PCT Pub. Date: Jan. 30, 2003

(65) Prior Publication Data
US 2003/0235525 A1 Dec. 25, 2003

(51) Int. Cl.[7] .......................... B01D 47/00; B01D 45/00; B01D 46/00; B01J 8/00
(52) U.S. Cl. ................. 423/210; 423/215.5; 423/239.1; 423/243.08
(58) Field of Search .............................. 423/210, 215.5, 423/239.1, 243.08

(56) References Cited

U.S. PATENT DOCUMENTS 4,160,730 A * 7/1979 Nguyen ...................... 210/718
5,435,980 A   7/1995 Felsvang et al.
6,638,485 B1 * 10/2003 Iida et al. ................... 423/210

FOREIGN PATENT DOCUMENTS

| EP | 860197 | 8/1998 |
|---|---|---|
| JP | 47-15443 | 5/1972 |
| JP | 2000-197811 | 7/2000 |

* cited by examiner

Primary Examiner—Colleen P. Cooke
(74) Attorney, Agent, or Firm—Oblon, Spivak, McClelland, Maier & Neustadt, P.C.

(57) ABSTRACT

The present invention provides a method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas after the wet desulfurization; calculating a predicted value of the inlet mercury concentration before the reductive denitration treatment on the basis of the measured mercury concentration; and controlling the feed rate of the chlorinating agent added prior to the reductive denitration treatment, according to the deviation of the predicted value from a reference inlet mercury concentration, as well as a system for the treatment of exhaust gas. Thus, the present invention provides an exhaust gas treatment process permitting the removal of mercury, and this process makes it possible to achieve efficient operation of the system and maintain the performance thereof without exerting any adverse influence the units within the system.

4 Claims, 8 Drawing Sheets

METHOD FOR THE TREATING IN EXHAUST GAS AND EXHAUST GAS TREATING SYSTEM

TECHNICAL FIELD

This invention relates to an exhaust gas treatment process and, in particular, a mercury removal method employed in an exhaust gas treatment process. More particularly, it relates to a method for removing metallic mercury effectively from exhaust gas in a system for desulfurizing a large volume of exhaust gas.

BACKGROUND ART

Harmful trace components such as mercury are present in exhaust gas resulting from the combustion of coal or heavy oil, and it is generally difficult to remove them in the existing exhaust gas treatment systems. It is believed that mercury exists in exhaust gas chiefly as metallic mercury (Hg) or mercury chloride ($HgCl_2$). Since $HgCl_2$ is easily absorbed into water, it can be removed in a desulfurizing absorption tower or the like. However, metallic mercury (Hg) has a very low solubility in water and cannot be absorbed in a desulfurizing absorption tower. Consequently, there is the possibility that metallic mercury vapor may be discharged from the stack.

For this reason, an activated carbon adsorption method, a sodium hypochlorite absorption method and the like have conventionally been employed as Hg removal techniques.

For the activated carbon adsorption method, a method in which activated carbon powder is blown into exhaust gas and recovered with a bag filter has already been put to practical use. However, this method is employed chiefly for the treatment of exhaust gas from refuse incineration, and its application to a large-volume gas such as exhaust gas from an electric power plant is not known.

For the sodium hypochlorite absorption method, there is a known method where an additive such as sodium hypochlorite is directly added, for example, to the cooling water of the cooling tower, the absorbing fluid of the desulfurizing absorption tower, or the feed water or circulating water of the wet dust collector. However, in all cases, an additive is added to a main unit in an exhaust gas treatment plant, and some additives involve the risk of interfering with its intrinsic function. For example, it is conceivable that the cooling water has a low pH and hence requires a large amount of an oxidizing agent, forming peroxides in the cooling tower, and oxidizing sulfurous acid in the wet dust collector to cause an increase in acidity. Moreover, this method has been adapted chiefly to the treatment of exhaust gas from refuse incineration, and is not suitable for the treatment of a large-volume gas such as exhaust gas from an electric power plant.

Meanwhile, metallic mercury is hardly soluble in water and hence passes through the desulfurizer, as described above. If metallic mercury can be made soluble in water, it may be removed in the desulfurizer. Accordingly, it is conceivable that, if metallic mercury can be converted into water-soluble mercury chloride on the catalyst of the denitrator, the mercury chloride may be removed in the desulfurizer installed downstream thereof. That is, an exhaust gas treatment method in which a chlorinating agent (e.g., hydrogen chloride) for converting metallic mercury into mercury chloride is injected on the upstream side of the denitrator is believed to be effective.

However, the addition of an excessive amount of the chlorinating agent involves a problem in that it can cause corrosion of the flue and downstream units of the system and eventually shortens the life of the plant equipment. Moreover, if the chlorinating agent is simply injected at a constant feed rate, this will cause an increase in utility costs.

More specifically, after the denitrator, an air heater, a dust collector, a gas-gas heater (heat exchanger) and a desulfurizing absorption tower are usually installed in that order. Yet amongst those, the chlorinating agent exerts a marked corrosive or damaging effect on the heat exchanger used for cooling purposes. Another problem is that since the chlorinating agent is introduced into the desulfurizing absorption tower, the chlorine concentration in the absorbing fluid increases causing corrosion or damage of the metallic parts of the tower. Moreover, an increase in chlorine concentration within the desulfurizing absorption tower may cause a reduction in oxidation capability during desulfurization or a reduction in desulfurization capability itself, leading to a reduction in the overall performance of the system. Furthermore, an increase in chloride concentration may cause an increase in the foamability of the absorbing fluid, possibility raising the pressure loss within the absorption tower and causing an increase in operating power.

DISCLOSURE OF THE INVENTION

In view of the above-described problems, the present inventors made intensive investigations for the purpose of developing a mercury removal method employed in an exhaust gas treatment system to remove mercury (in particular, metallic mercury vapor) contained in a large-volume gas such as exhaust gas from an electric power plant. This method properly controls or regulates the amount of chlorinating agent added to remove mercury and thereby makes it possible to achieve efficient operation of the system and maintain the performance thereof without exerting any adverse influence on the downstream units.

As a result, the present inventors have now found that, instead of introducing a chlorinating agent simply on the upstream side of the desulfurizer, the above-described problems can be solved by monitoring the mercury concentration continuously at a position after desulfurization (e.g., the outlet of the desulfurizing absorption tower, the outlet of the dust collector, or the outlet of the reheater) and adding a necessary and sufficient amount of a chlorinating agent accordingly. The present invention has been completed from this point of view.

That is, the present invention provides a method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas after the wet desulfurization; calculating a predicted value of the inlet mercury concentration before the reductive denitration treatment on the basis of the measured mercury concentration; and controlling the feed rate of the added chlorinating agent prior to the reductive denitration treatment, according to the deviation of the predicted value from a reference inlet mercury concentration. The mercury concentration in the exhaust gas after the wet desulfurization may be measured at a position prior to any of the wet dust collector, reheater or stack installed on the downstream side of the desulfurizer. Where a cooling tower is installed before the desulfurizing absorption tower, mercury chloride is also removed in the cooling tower. Accordingly, the mercury concentration may also be measured at a position prior to the desulfurizing absorption tower installed downstream of the cooling tower. Since the inlet mercury concentration may vary according to the boiler load and the type of coal, the reference inlet mercury concentration is defined as a mercury concentration previously measured at the outlet of the boiler for each type of coal or a mercury concentration calculated from the mercury content of coal, and refers to the sum of the concentrations of metallic mercury and mercury chloride.

Moreover, the present invention provides a method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas before the wet desulfurization; calculating a predicted value of the outlet mercury concentration after the wet desulfurization on the basis of the measured mercury concentration; and controlling the feed rate of the added chlorinating agent prior to the reductive denitration treatment, according to the deviation of the predicted value from a reference outlet mercury concentration. The mercury concentration in the exhaust gas before the wet desulfurization may be measured at a position prior to any of the denitrator, air heater (A/H), heat exchanger, electrostatic precipitator or desulfurizer. The reference outlet mercury concentration is a target value of the outlet mercury concentration. However, since a delay in response usually occurs in the control system, the reference outlet mercury concentration is defined as a value obtained by subtracting the magnitude of concentration fluctuations from the upper limit of the emitted mercury concentration.

Furthermore, the present invention provides a method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas before and after the wet desulfurization; and controlling the feed rate of the added chlorinating agent prior to the reductive denitration treatment, according to the deviation of each of the measured mercury concentrations from a reference mercury concentration. According to this method, the accuracy of a predicted value of the mercury concentration can be improved by detecting the boiler load or the operating load signal of the electrostatic precipitator and the desulfurizer.

In addition, the present invention provides a system for the treatment of exhaust gas wherein, after a chlorinating agent is added to exhaust gas containing nitrogen oxides, sulfur oxides and mercury by means of a chlorinating agent feeding device, the exhaust gas is subjected to a denitration treatment in the presence of a solid catalyst of a reductive denitrator and then to desulfurization using an alkaline absorbing fluid within a wet desulfurizer, the system being characterized in that a mercury concentration meter is provided on downstream side of the wet desulfurizer, and a flow rate control signal from an arithmetic unit and a controller which are connected to the mercury concentration meter is sent to the chlorinating agent feeding device. In the aforesaid arithmetic unit, a predicted value of the inlet mercury concentration before the reductive denitration treatment is primarily calculated on the basis of the mercury concentration in the exhaust gas which is measured at a position after the wet desulfurization and prior to the wet dust collector, reheater or stack. Then, the aforesaid controller controls the feed rate of the chlorinating agent through a signal representing the deviation of the inlet mercury concentration calculated by the aforesaid arithmetic unit from a predetermined reference inlet mercury concentration.

Thus, the present invention provides a mercury removal method employed in an exhaust gas treatment system to remove mercury (in particular, metallic mercury vapor) contained in a large-volume gas such as exhaust gas from an electric power plant, which controls or regulates properly the amount of chlorinating agent added for the removal of mercury and thereby makes it possible to achieve efficient operation of the system and maintain the performance thereof without exerting any adverse influence on the downstream units.

Specifically, with respect to the units installed on the downstream side of the denitrator, such as the air heater, dust collector, gas-gas heater (heat exchanger) and desulfurizing absorption tower, the problem of corrosion or damage due to the addition of an excess of the chlorinating agent can be prevented effectively. Moreover, since an increase in chlorine concentration within the desulfurizing absorption tower is suppressed, a reduction in oxidation capability or desulfurization capability during desulfurization and an increase in the foamability of the absorbing fluid can also be prevented. Thus, the overall performance of the system, including the desulfurization capability, can be maintained or improved.

Furthermore, according to the present invention, the utility costs required for operation can be minimized by optimizing the feed rate of the chlorinating agent (e.g., hydrogen chloride) and saving any excess thereof.

In the foregoing figures, reference numeral 1 designates a boiler; 2, a denitrator; 3, an air heater (A/H); 4, a dust collector; 5, a heat exchanger; 6, a desulfurizing absorption tower; 7, a wet dust collector; 8, a reheater; 9, a stack; 10, a chlorinating agent feed valve; 11, mercury concentration measuring sites; 12, a mercury feeding device; 13, a chlorinating agent feeding device; 14, a continuous mercury meter; 15, an arithmetic unit; 16, a controller; and 17, a feed rate controller.

BEST MODE FOR CARRYING OUT THE INVENTION

In the exhaust gas treatment of the present invention, after a chlorinating agent is added to exhaust gas containing nitrogen oxides (NOx), sulfur oxides (SOx) and mercury (Hg), the exhaust gas is subjected to a reductive denitration treatment in the presence of a solid catalyst and then to wet desulfurization using an alkaline absorbing fluid. On the upstream side and/or downstream side of the wet desulfurization, the mercury concentration in the exhaust gas is measured. On the basis of the measured mercury concentration, a predicted value of the inlet mercury concentration before the reductive denitration treatment or a predicted value of the outlet mercury concentration after the desulfurization treatment is calculated. Then, the feed rate of the chlorinating agent added prior to the reductive denitration treatment is controlled according to the deviation of the predicted value from a reference mercury concentration.

Thus, not only can the added chlorinating agent be made to act effectively on metallic mercury, but also the adverse influence of excessive chlorinating agent on the system can be avoided.

In the present invention, the feed rate of the chlorinating agent may be controlled according to any of the following three principal methods.

① A method in which the outlet mercury concentration is detected and the feed rate of the chlorinating agent is controlled by a signal representing the deviation of a predicted value of the inlet mercury concentration from a reference inlet concentration (first embodiment).

② A method in which the mercury concentration before desulfurization is detected and the feed rate of the chlorinating agent is controlled by a signal representing the deviation of a predicted value of the outlet mercury concentration from a reference outlet concentration (second embodiment).

③ A method in which the mercury concentration before desulfurization and the outlet mercury concentration are detected and the feed rate of the chlorinating agent is controlled by both a signal representing the deviation of the mercury concentration before desulfurization from a reference inlet concentration, and a signal representing the deviation of the outlet mercury concentration from a predicted value of the outlet mercury concentration calculated from the mercury concentration before desulfurization (third embodiment).

Figure 4:
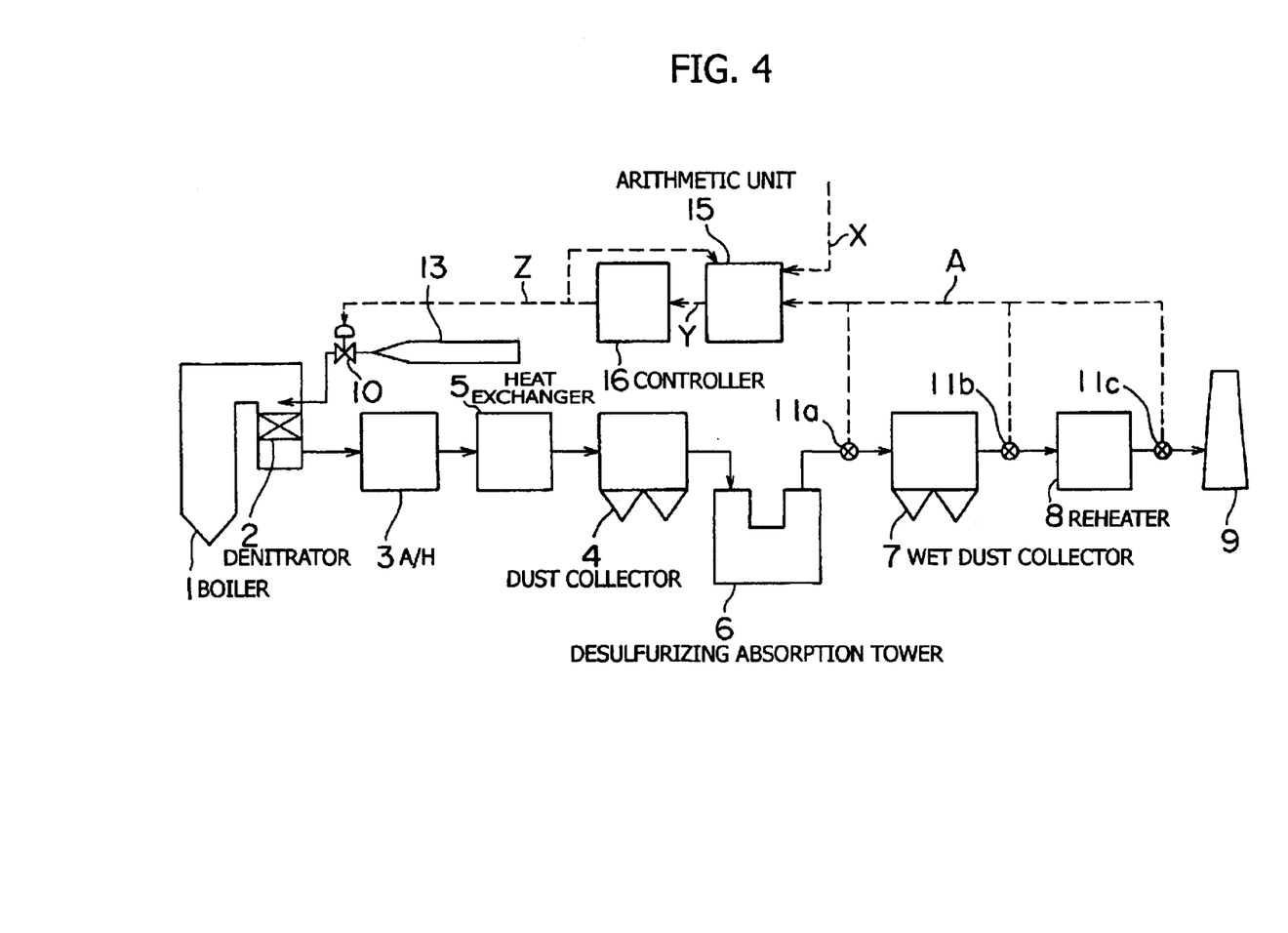
FIG. 4 is a flow diagram illustrating an example of the control system used when the mercury treatment method of the present invention is carried out.
Figure 5:
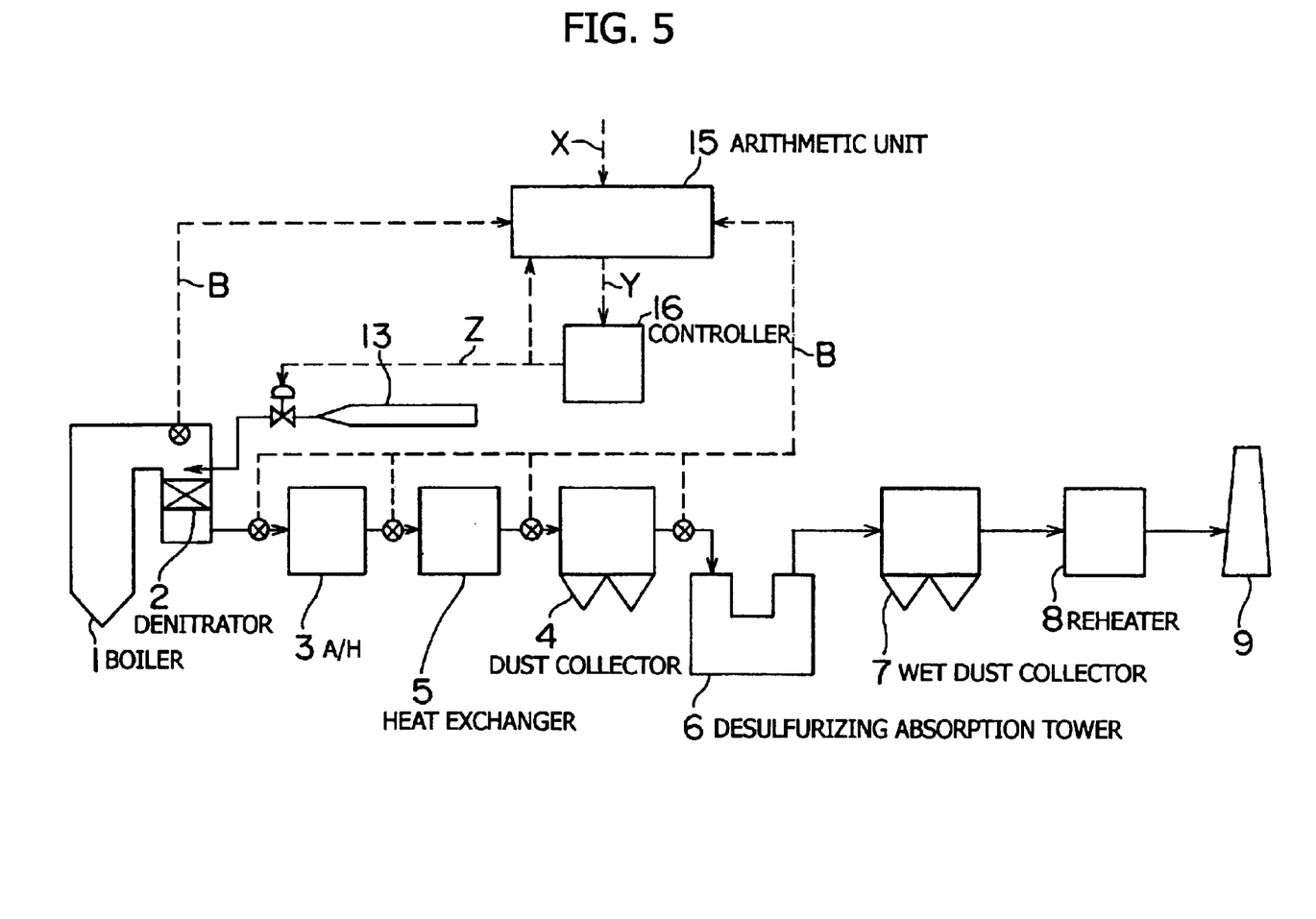
FIG. 5 is a flow diagram illustrating another example of the control system used when the mercury treatment method of the present invention is carried out.

Examples of the systems employing these methods are illustrated in FIG. 4 (first embodiment), FIG. 5 (second embodiment) and FIG. 4 (third embodiment), respectively. Now, these embodiments of the mercury treatment method of the present invention are specifically described below with reference to the accompanying drawings.

First Embodiment

In the present invention, after a chlorinating agent is added to exhaust gas containing NOx, SOx and mercury, the exhaust gas is subjected to a reductive denitration treatment in the presence of a solid catalyst, and then to wet desulfurization using an alkaline absorbing fluid. When this treatment method is carried out in a desulfurizing absorption tower, which is a unit within the system, the exhaust gas is brought into contact with an absorbing fluid such as a circulating lime slurry and thereby freed of SOx by absorption into the absorbing fluid. For mercury contained in the exhaust gas, mercury chloride ($HgCl_2$) is also removed by dissolution into the aforesaid absorbing fluid. However, metallic mercury (Hg) is not removed by the absorbing fluid because mercury in metallic form has a very low solubility in water. Consequently, metallic mercury is contained in the desulfurized exhaust gas as metallic mercury vapor and passes through the desulfurizing absorption tower.

Accordingly, in the present invention, a chlorinating agent is added to the exhaust gas just prior to the denitrator. Thus, after metallic mercury is converted into water-soluble mercury chloride, the exhaust gas is introduced into the desulfurizing absorption tower.

In the present invention, the chlorinating agent is usually added just prior to the denitration treatment. Although the catalyst used in the reductive denitrator may have a variety of forms, it generally comprises a titania-based oxidation catalyst having a honeycomb structure or the like. Since (about 90% or more of) metallic mercury can be oxidized on this catalyst, the chlorinating agent (e.g., hydrogen chloride) is introduced on the upstream side of the denitrator. That is, the solid catalyst within the denitrator acts not only as the originally intended denitration catalyst, but also as a catalyst for converting metallic mercury into mercury chloride.

Figure 1:
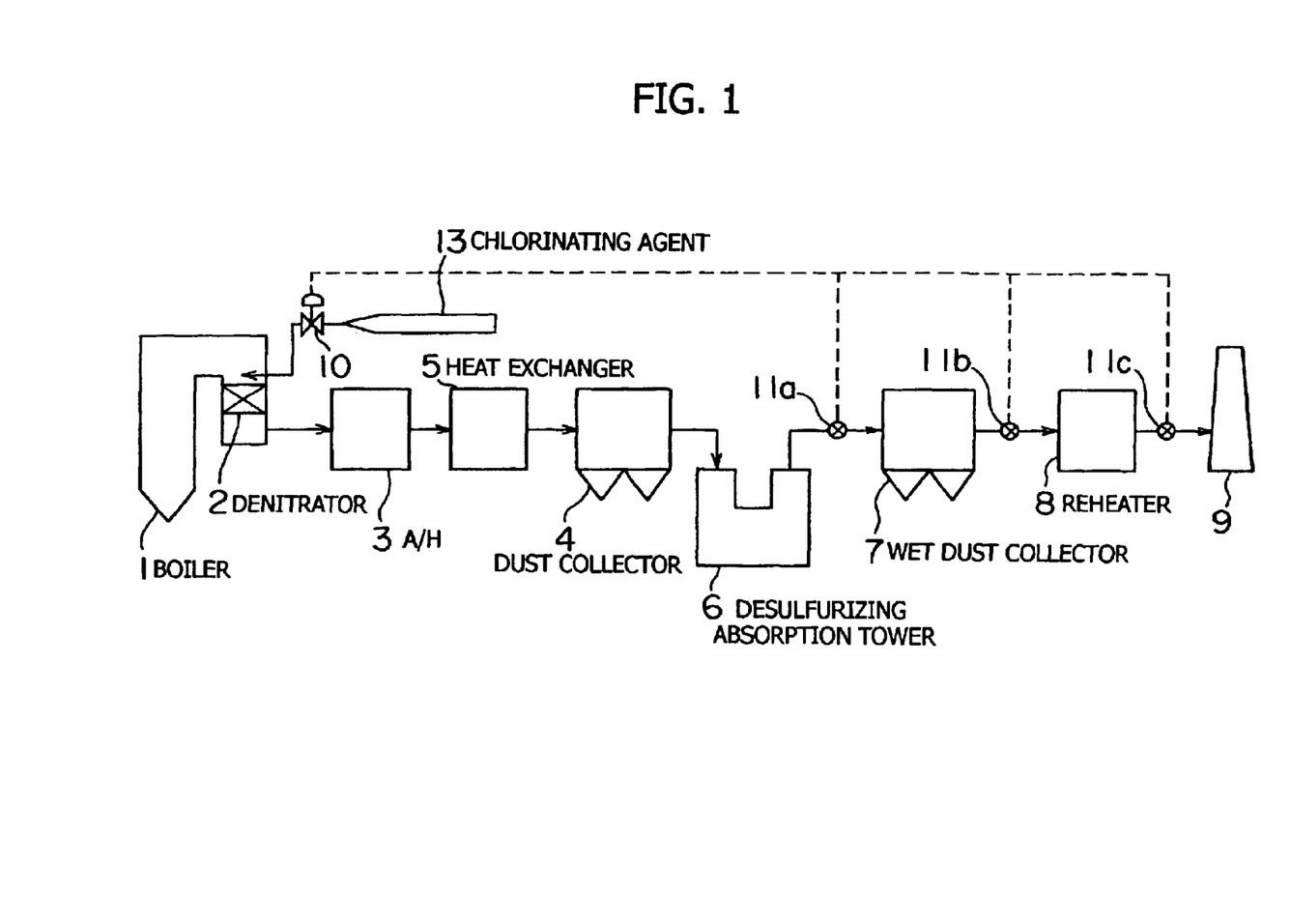
FIG. 1 is a schematic flow diagram illustrating one example of the mercury treatment method of the present invention.

FIG. 1 is a schematic illustration of a system employing the treatment method in accordance with this embodiment.

In the system of FIG. 1, exhaust gas leaving a denitrator 2 installed downstream of a boiler 1 is passed through an air heater (A/H) 3, a heat exchanger 5 for recovering thermal energy, and a dust collector 4, and then introduced into a desulfurizing absorption tower 6. No particular limitation is placed on the type of dust collector 4, provided that rough dust collection can be achieved before the exhaust gas is introduced into desulfurizing absorption tower 6. No particular limitation is placed on the type of desulfurizing absorption tower 6, and it may comprise a two-tower type desulfurizer commonly used in exhaust gas treatment, or an absorption tower having a cooling tower installed upstream thereof.

In the above-described desulfurization system based on the wet process, a wet dust collector 7 and a reheater 8 are installed downstream of desulfurizing absorption tower 6, and the exhaust gas is passed through these units and discharged into the atmosphere through a stack 9. In reheater 8, the combustion exhaust gas having a reduced temperature is heated with thermal energy recovered by heat exchanger 5 installed upstream of desulfurizing absorption tower 6. If the exhaust gas having a reduced temperature is discharged directly from the stack, the problem of white smoke production due to water vapor will arise. Accordingly, when combustion exhaust gas is discharged, it is common practice to heat the purified gas and discharge the resulting hot gas. For this reason, in the system based on the wet process, heat exchanger 8 for the supply of heat is installed on the downstream side of desulfurizing absorption tower 6.

According to this embodiment, as shown in FIG. 1, a chlorinating agent feeding device 13 is installed in the flow path extending from boiler 1 to reductive denitrator 2. Moreover, this system is usually equipped with an ammonia injector (not shown) for injecting ammonia supplied from an ammonia tank into exhaust gas.

The exhaust gas leaving boiler 1 is introduced into reductive denitrator 2. In this reductive denitrator, the exhaust gas having $NH_3$ and HCl or the like injected thereinto undergoes the reaction of $NH_3$ with NOx. At the same time, metallic Hg is oxidized to $HgCl_2$ in the presence of HCl. Thereafter, the exhaust gas is passed through air heater 3 and heat exchanger 5, freed of soot and dust in electrostatic precipitator 4, and then introduced into wet desulfurizer 6 where both $SO_2$ and $HgCl_2$ are removed from the exhaust gas. Although the exhaust gas leaving the reductive denitrator contains excess HCl, it is absorbed into the alkaline aqueous solution (e.g., lime slurry) in the desulfurizer and is not discharged from the stack.

Thus, the present invention relates to an exhaust gas treatment process wherein NOx present in exhaust gas is removed in the reductive denitrator, $SO_2$ is removed in the wet desulfurizer using an alkaline absorbing fluid as the absorbent, and a chlorinating agent is added on the upstream side of the denitrator. Even if $NH_3$, which is required for the purpose of denitration, is not added on the upstream side of the reductive denitrator, it is possible to convert mercury into a chloride with the aid of the chlorinating agent in the presence of the catalyst of the reductive denitrator and thereby remove the mercury in the wet desulfurizer.

The exhaust gas from which Hg has been removed in desulfurizing absorption tower 6 is introduced into reheater 8, where it is heated with thermal energy recovered by heat exchanger 5. Thereafter, the heated exhaust gas is discharged from stack 9.

Thus, in the present invention, after a chlorinating agent is added to exhaust gas, the exhaust gas is treated in the presence of a solid catalyst to convert metallic mercury into a water-soluble mercury compound, and this water-soluble mercury compound in the exhaust gas is removed in the wet desulfurization step. However, depending upon the feed rate of the chlorinating agent, serious problems may arise in that an excessively small amount of the chlorinating agent may cause much metallic mercury to remain and be discharged, or an excessively large amount of the chlorinating agent may cause corrosion of the piping and units or a reduction in desulfurization capability.

According to this embodiment, the mercury concentration in the exhaust gas after the wet desulfurization is measured, a predicted value of the inlet mercury concentration at the inlet of the reductive denitration treatment is calculated on the basis of the measured mercury concentration, and the feed rate of the chlorinating agent added prior to the reductive denitration treatment is controlled according to the deviation of the predicted value from a predetermined reference inlet mercury concentration.

Now, where hydrogen chloride is used as the chlorinating agent, the method for controlling the amount of hydrogen chloride added for the removal of mercury is explained below.

The oxidation of mercury with hydrogen chloride can be represented by the following reaction formula.

$$Hg + 2HCl + 1/2 O_2 > HgCl_2 + H_2O$$

Assuming that the oxidation rate of mercury to mercury chloride is represented by $r_{ox} = kp_{Hgin}^a \cdot p_{O2}^b \cdot p_{HCl}^c$, the $O_2$ and Hg concentrations cannot be controlled because they depend upon the boiler load, the type of carbon, and the like. However, the oxidation rate of mercury to mercury chloride can be controlled by varying the feed rate of HCl.

For example, assuming that mercury contained in exhaust gas resulting from the combustion of coal exists in two forms, $Hg^0$ and $HgCl_2$, the outlet mercury concentration can be expressed by the following equation (1).

$$p_{ToHgout} = p_{ToHgin} - \{p_{Hgin}(1 - \eta_{ox}) \cdot \eta_{Hg} + (p_{Hgin} \cdot \eta_{ox} + p_{HgCl2in}) \cdot \eta_{HgCl2}\} \quad (1)$$

wherein $p_{ToHgin}$: Inlet partial pressure of total mercury.
$p_{ToHgout}$: Outlet partial pressure of total mercury.
$p_{Hgin}$: Inlet partial pressure of $Hg^0$.
$p_{HgCl2in}$: Inlet partial pressure of $HgCl_2$.
$\eta_{ox}$: Degree of oxidation of metallic mercury.
$\eta_{Hg}$: Degree of removal of metallic mercury in the exhaust gas treatment system.
$\eta_{HgCl2}$: Degree of removal of mercury chloride in the exhaust gas treatment system.

In this equation, the inlet partial pressure of mercury varies according to the boiler load and the type of coal. Moreover, the degree of removal of mercury in the exhaust gas treatment system is the degree of removal of mercury in the dust collector, the desulfurizing absorption tower and the like, and hence depends upon the operating conditions of these units.

Generally, since the degree of removal ($\eta_{Hg}$) of metallic mercury ($Hg^0$) is lower than the degree of removal ($\eta_{HgCl2}$) of mercury chloride ($HgCl_2$), the degree of removal of mercury in the exhaust gas treatment system can be enhanced by increasing the amount of metallic mercury oxidized to mercury chloride. Moreover, since the degree of oxidation ($\eta_{ox}$) of metallic mercury depends upon the feed rate of HCl, the amount of catalyst charged, the catalyst temperature, and the like, the degree of oxidation of metallic mercury can be enhanced by increasing the feed rate of HCl.

Accordingly, in this embodiment, the feed rate of the chlorinating agent and the degree of oxidation of metallic mercury are controlled by using the control system illustrated in FIG. 4.

The outlet mercury concentration A is detected at a position selected from the desulfurizing absorption tower outlet 11a (or the cooling tower outlet when a cooling tower is installed), the wet dust collector outlet 11b, and the reheater outlet 11c. Then, in an arithmetic unit 15, a predicted value of the inlet mercury concentration is calculated on the basis of the feed rate of the chlorinating agent (HCl) and the degree of removal of mercury in the exhaust gas treatment system (or the degrees of removal of mercury in various units). According to the type of coal and the boiler load signal X, the aforesaid predicted value Y is compared with a predetermined reference inlet mercury concentration. A controller 16 sends a signal representing the deviation to a chlorinating agent feed valve 10 as a command Z for controlling the flow rate of the chlorinating agent. As a result, the flow rate of chlorinating agent 13 is properly controlled by regulating chlorinating agent feed valve 10.

Thus, by inputting the boiler load signal X into arithmetic unit 15 for predicting the inlet mercury concentration, this control system can accommodate variations in boiler load. Consequently, a load follow-up delay due to a delay in the detection of the outlet mercury concentration can be prevented.

Moreover, the degree of removal of each mercury compound in the exhaust gas treatment system depends upon the operating conditions of the electrostatic precipitator and the desulfurizer. Accordingly, by inputting signals representing the operating conditions of the electrostatic precipitator and the desulfurizer (e.g., the electric field strength and other conditions of the electrostatic precipitator, and the circulation flow rate and other conditions of the desulfurizer) into arithmetic unit 15, it may be possible to calculate a more accurate predicted value of the mercury concentration and control the feed rate of the chlorinating agent thereby. Thus, the control system can accommodate variations in the operating conditions of the electrostatic precipitator and the desulfurizer, and can thereby control the flow rate more properly.

The exhaust gas to be treated in the present invention may comprise, for example, exhaust gas from the boilers of thermal electric power plants and factories in which a fuel containing sulfur and mercury (e.g., coal or heavy oil) is burned, or exhaust gas from the heating furnaces of metal processing shops, petroleum refineries, and petrochemical plants. Usually, such exhaust gas has a low NOx concentration, contains carbon dioxide, oxygen, SOx, soot, dust and moisture, and is discharged in large volumes.

The reductive denitration method used in the present invention is usually a method which comprises using ammonia as a reducing agent and reducing NOx present in the exhaust gas to nitrogen in the presence of a solid catalyst. The injection of ammonia is carried out in the usual manner.

The solid catalyst used for reductive denitration in the present invention may comprise, for example, an oxide or sulfate of a metal such as V, W, Mo, Ni, Co, Fe, Cr, Mn or Cu; a noble metal such as Pt, Ru, Rh, Pd or Ir; or a mixture thereof. Such a catalytic substance may be supported on a carrier selected from titania, silica, zirconia and double oxides thereof; zeolite; and the like.

The chlorinating agent used in the present invention is a compound which reacts with mercury present in the exhaust gas in the presence of the aforesaid catalyst to form $HgCl_2$ or HgCl. Examples thereof include hydrogen chloride (HCl), ammonium chloride, chlorine, hypochlorous acid, ammonium hypochlorite, chlorous acid, ammonium chlorite, chloric acid, ammonium chloride, perchloric acid, and ammonium perchlorate; and amine salts and other salts of the foregoing acids. When hydrogen chloride is added, hydrogen chloride itself may be used as a chemical agent, or an aqueous solution thereof (i.e., hydrochloric acid) may be used. No particular limitation is placed on the concentration of hydrochloric acid. For example, usable hydrochloric acid may range from concentrated hydrochloric acid to dilute hydrochloric acid having a concentration of about 5%. As the device for adding hydrogen chloride to the exhaust gas, there may be used a conventionally known metering pump for chemical solutions. When a salt such as ammonium chloride is added, it is preferable to use an aqueous solution of the salt. The chlorinating agent may be added either before or after the addition of ammonia to the exhaust gas.

For the wet desulfurizer a conventional unit may be used. The absorbing fluid used for wet desulfurization may comprise an aqueous solution of an absorbent such as calcium carbonate, calcium oxide, calcium hydroxide, sodium carbonate or sodium hydroxide (i.e., an alkaline absorbing fluid).

Generally, the content of metallic mercury in the exhaust gas is about 10 $\mu g/m^3 \cdot N$ at the outlet of the boiler and several $\mu g/m^3 \cdot N$ at the stack. A certain type of exhaust gas to be treated (e.g., exhaust gas resulting from the combustion of coal) may already contain some hydrogen chloride, for example, at a concentration of about 10–30 ppm. Accordingly, when the chlorinating agent is added at a constant feed rate, the concentration of metallic mercury remaining after the denitrator may vary according to the difference in the type of exhaust gas to be treated. This makes it difficult to eliminate adverse effects due to the addition of an excess of the chlorinating agent.

In the present invention, the mercury concentration is measured after the removal of mercury chloride in the desulfurizing absorption tower, and a proper amount of the chlorinating agent is fed according to the measured mercury concentration. Consequently, even if the type and composition of the exhaust gas to be treated are changed, the chlorinating agent is not fed in excess and, therefore, any adverse influence on the system can be avoided. Moreover, as compared with when the chlorinating agent is always added at a constant feed rate, the utility costs required for operation can be reduced as much as possible. For example, where the chlorinating agent is always added to exhaust gas resulting from the combustion of coal or heavy oil, for example, at a constant feed rate to give a concentration of about 10 to 100 ppm, the operational control of the present invention makes it possible to achieve reliable removal of mercury by varying the feed rate to between about 30%–50% of the aforesaid level. This means a saving of 50–70% of the amount of chlorinating agent added, leading to a marked reduction in cost.

Second Embodiment

FIG. 5 illustrates an example of the system employing the treatment method in accordance with this embodiment. For an exhaust gas treatment system, this system is such that, after a chlorinating agent feeding device is used to add a chlorinating agent to exhaust gas containing nitrogen oxides, sulfur oxide and mercury, the exhaust gas is subjected to a reductive denitration treatment in the presence of a solid catalyst of a reductive denitrator, and then to desulfurization using an alkaline absorbing fluid within a wet desulfurizer. Thus, this exhaust gas treatment system is the same as that described above in connection with the first embodiment, but the method for controlling the feed rate of the chlorinating agent is different.

In this embodiment, the mercury concentration before desulfurization B is detected at a position (on the upstream side of the desulfurizer) selected from the denitrator inlet, the A/H inlet, the heat exchanger inlet, the dust collector inlet, and the like. Similarly to the above-described first embodiment, a predicted value of the outlet mercury concentration is calculated on the basis of the feed rate of the chlorinating agent and the degree of removal of mercury in the exhaust gas treatment system (or the degrees of removal of mercury in various units). Then, the flow rate of the chlorinating agent is controlled by a signal representing the deviation of the predicted value from a predetermined reference outlet mercury concentration (or a target value of the outlet mercury concentration). The predicted value of the outlet mercury concentration is calculated according to the aforesaid equation (1). When the mercury concentration measured at the outlet of the dust collector is used, the predicted value of the outlet mercury concentration is calculated by subtracting the degree of removal of mercury in dust collector 4 from a predetermined degree of removal of mercury in the exhaust gas treatment system ($\eta_{Hg}$, $\eta_{HgCl2}$).

In the system of this embodiment, a mercury concentration meter is provided at any of the aforesaid detection sites on the upstream side of the wet desulfurizer. This mercury concentration meter is connected to an arithmetic unit 15 and a controller 16, which sends a flow rate control signal Z to a chlorinating agent feed valve. Thus, a proper amount of the chlorinating agent can be added to the exhaust gas on the upstream side of the denitrator.

Moreover, by inputting the boiler load signal and the operating signals of the dust collector and the desulfurizer into arithmetic unit 15 for predicting the outlet mercury concentration, this control system can accommodate variations in boiler load and variations in the operating conditions of the dust collector and the desulfurizer. Consequently, a load follow-up delay due to a delay in the detection of the outlet mercury concentration can be prevented.

Third Embodiment

Figure 6:
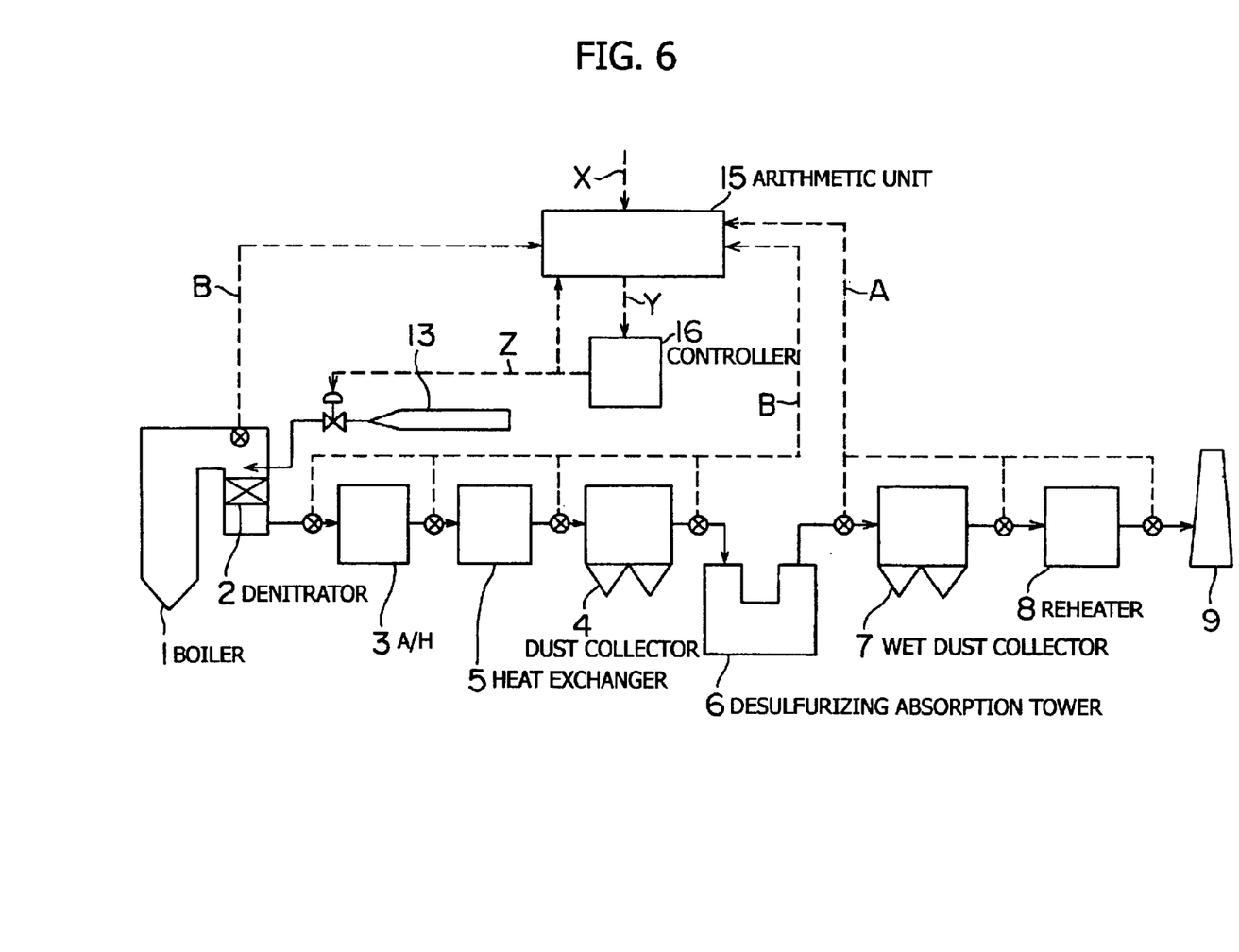
FIG. 6 is a flow diagram illustrating still another example of the control system used when the mercury treatment method of the present invention is carried out.

FIG. 6 illustrates an example of the system employing the treatment method in accordance with this embodiment. As an exhaust gas treatment system, this system is such that, after a chlorinating agent feeding device is used to add a chlorinating agent to exhaust gas, the exhaust gas is subjected to a reductive denitration treatment in the presence of a solid catalyst of a reductive denitrator, and then to desulfurization using an alkaline absorbing fluid within a wet desulfurizer. Thus, this exhaust gas treatment system is the same as that described above in connection with the first embodiment.

In this embodiment, similarly to the above-described second embodiment, the mercury concentration before desulfurization B is detected at a position (on the upstream side of the desulfurizer) selected from the denitrator inlet, the A/H inlet, the heat exchanger inlet, the dust collector inlet, and the like. On the other hand, the outlet mercury concentration A is detected at a position selected from the desulfurizing absorption tower outlet (or the cooling tower outlet when a cooling tower is installed), the wet dust collector outlet, the reheater outlet, and the like.

Then, in an arithmetic unit 15, the deviation of the mercury concentration before desulfurization from a reference inlet mercury concentration predetermined on the basis of the boiler load signal and the type of coal is obtained. Moreover, a predicted value of the outlet mercury concentration is calculated on the basis of the feed rate of the chlorinating agent and the degree of removal of mercury in the exhaust gas treatment system (or the degrees of removal of mercury in various units), and the deviation of the predicted value from a predetermined reference outlet mercury concentration (or a target value of the outlet mercury concentration) is obtained. Using signals representing these deviations, a controller 16 controls the feed rate of the chlorinating agent by means of a chlorinating agent feeding device.

Moreover, by inputting the boiler load signal and the operating signals of the dust collector and the desulfurizer into arithmetic unit 15 for predicting the mercury concentration, this control system can accommodate variations in boiler load and variations in the operating conditions of the dust collector and the desulfurizer. Consequently, a load follow-up delay due to a delay in the detection of the mercury concentration can be prevented.

Thus, the present invention provides a mercury removal method employed in an exhaust gas treatment system to remove mercury (in particular, metallic mercury vapor) contained in a large-volume gas such as exhaust gas from an electric power plant, which method controls or regulates properly the amount of chlorinating agent added for the removal of mercury and thereby makes it possible to achieve efficient operation of the system and maintain the performance thereof without exerting any adverse influence on the downstream units.

Moreover, according to the present invention, with respect to the units installed on the downstream side of the denitrator, such as the air heater, dust collector, gas-gas heater (heat exchanger) and desulfurizing absorption tower, the problem of corrosion or damage due to the addition of an excess of the chlorinating agent can be prevented effectively. In particular, the problem of corrosion of the heat exchanger used for cooling purposes, and the problem of corrosion or damage of the metallic parts of the desulfurizing absorption tower due to arise in the chlorine concentration of the absorbing fluid caused by the introduction of hydrogen chloride can be avoided. Moreover, since an increase in chlorine concentration within the desulfurizing absorption tower is suppressed, a reduction in oxidation capability or desulfurization capability during desulfurization and an increase in the foamability of the absorbing fluid can also be prevented. Thus, the overall performance of the system, including the desulfurization capability, can be maintained or improved.

Furthermore, according to the present invention, the utility costs required for operation can be minimized by optimizing the feed rate of the chlorinating agent (e.g., hydrogen chloride) and saving any excess thereof.

In order to confirm the controlling effect of a chlorinating agent added in the present invention, the following experiments were carried out. However, this example is not to be construed to limit the scope of the invention.

EXAMPLE 1

Figure 2:
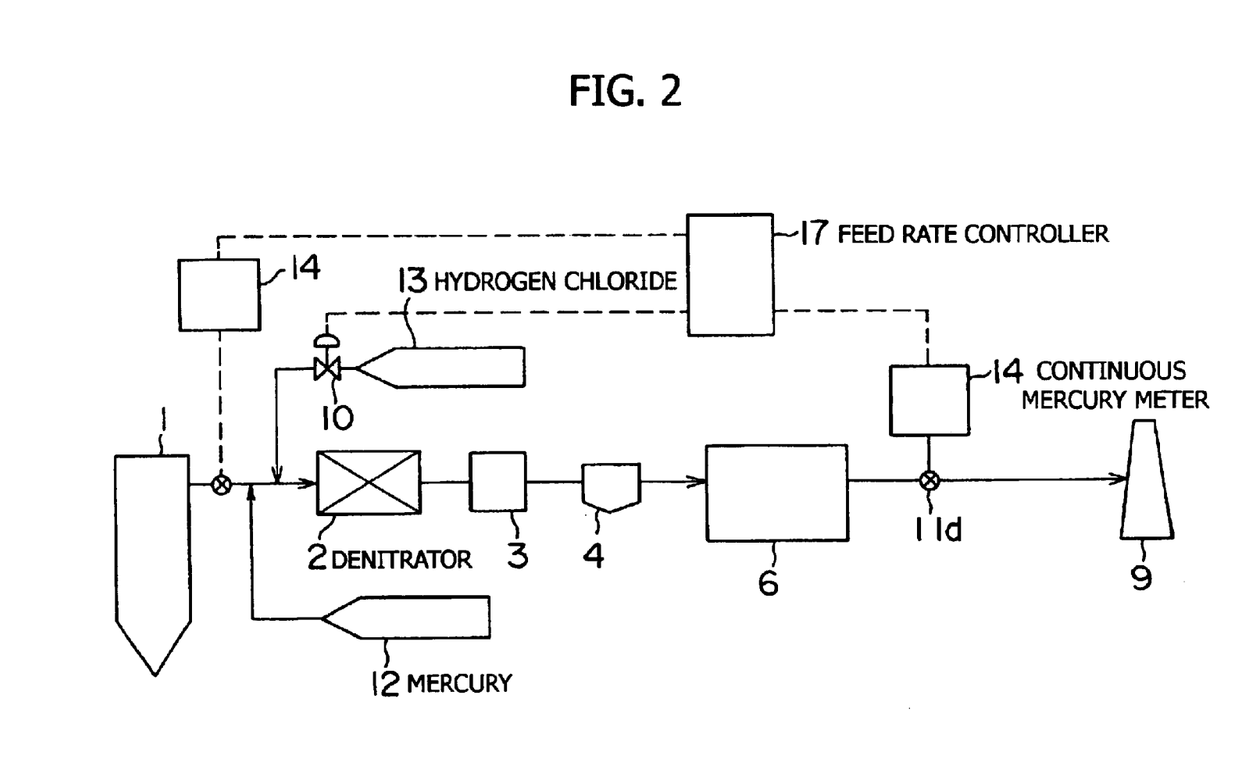
FIG. 2 is a flow diagram illustrating an outline of the testing system used in Example 1 of the present invention.

Using a testing system illustrated in FIG. 2, an experiment was carried out in which the feed rate of hydrogen chloride was controlled according to the results obtained by monitoring with a continuous mercury meter 14.

In the testing system of this example a mercury feeding device 12 is provided on the upstream side of the denitration catalyst because it is necessary to vary the mercury concentration in the exhaust gas in order to examine the proper amount of hydrogen chloride added.

As for the test conditions, the gas flow rate was 280 $m^3N/h(w)$, the SV of the denitration catalyst was 8,000 $h^{-1}$, the catalyst temperature was 300–360° C., the mercury concentration was 10–100 $\mu g/m^3N$, and the temperature of the desulfurization absorption tower was 50° C.

In this example, the inlet mercury concentration in the exhaust gas was fixed at 100 $\mu g/m^3N$ by means of mercury feeding device 12, altered to 30 $\mu g/m^3N$ after the lapse of a predetermined time, and then returned again to 100 $\mu g/m^3N$. The feed rate of hydrogen chloride 13 serving as a chlorinating agent was not varied but fixed so as to give a concentration of 100 ppm. The target value of the outlet mercury concentration was fixed at 15 $\mu g/m^3N$.

Figure 3:
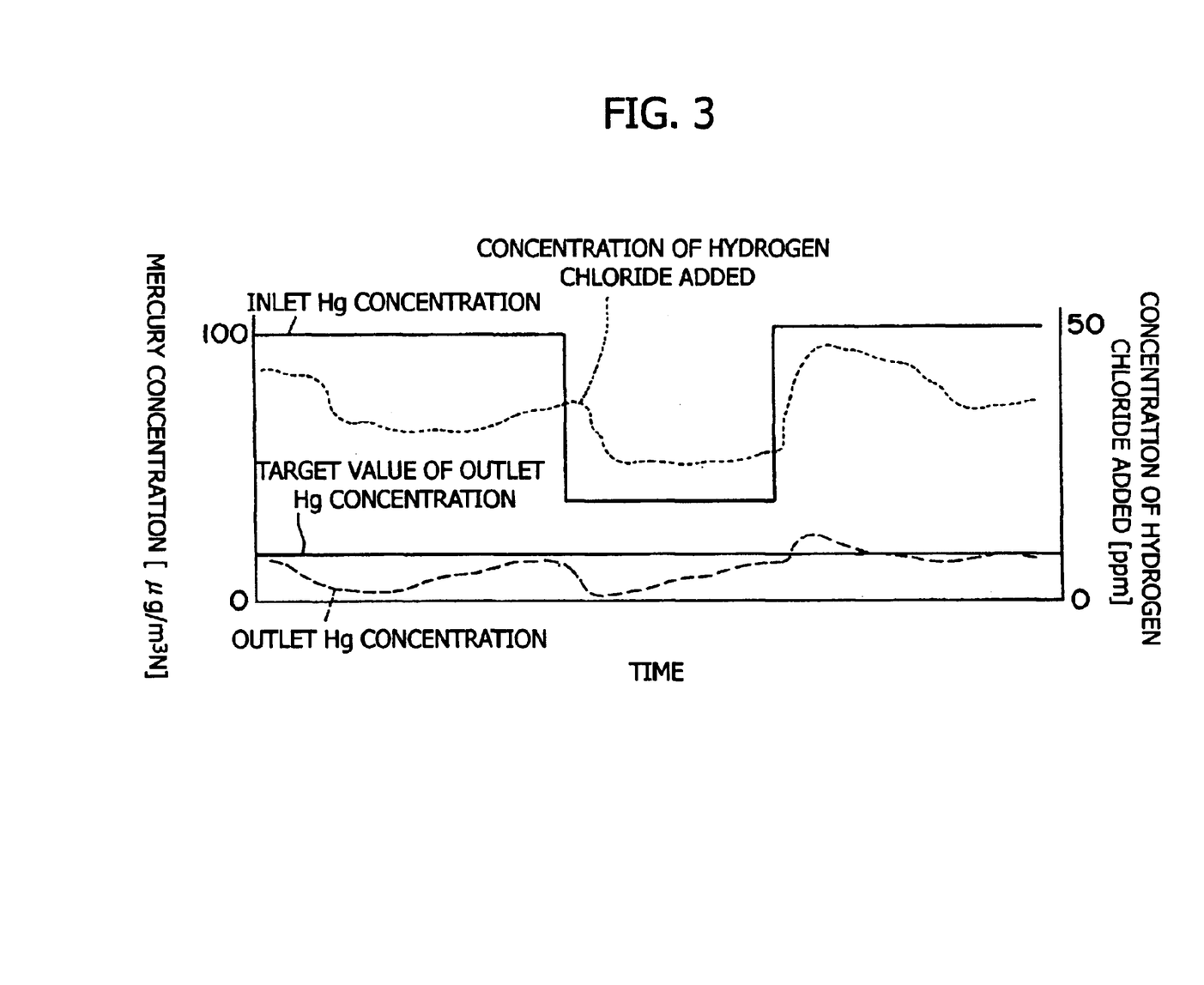
FIG. 3 is a diagram showing the conditions employed and the results of measurement obtained when the system of FIG. 4 was used in Example 1.

During this test period, the outlet mercury concentration was measured with a continuous mercury meter 14. The results obtained when the system of FIG. 4 in accordance with the first embodiment was used are shown in the graph of FIG. 3.

From these results, it was confirmed that the measured value of the outlet mercury concentration varied in the same manner as the inlet mercury concentration increased or decreased. Consequently, in some cases, the outlet mercury concentration fell below the aforesaid target value and, therefore, the feed rate of hydrogen chloride was excessive. Changes over time of the concentration of chlorinating agent to be added so as to avoid such excessive feeding thereof are shown by a dotted line in FIG. 3. From this example, it has been made clear that the outlet mercury concentration can be adjusted to the target value by detecting the inlet mercury concentration and controlling the amount of chlorinating agent added.

Figure 7:
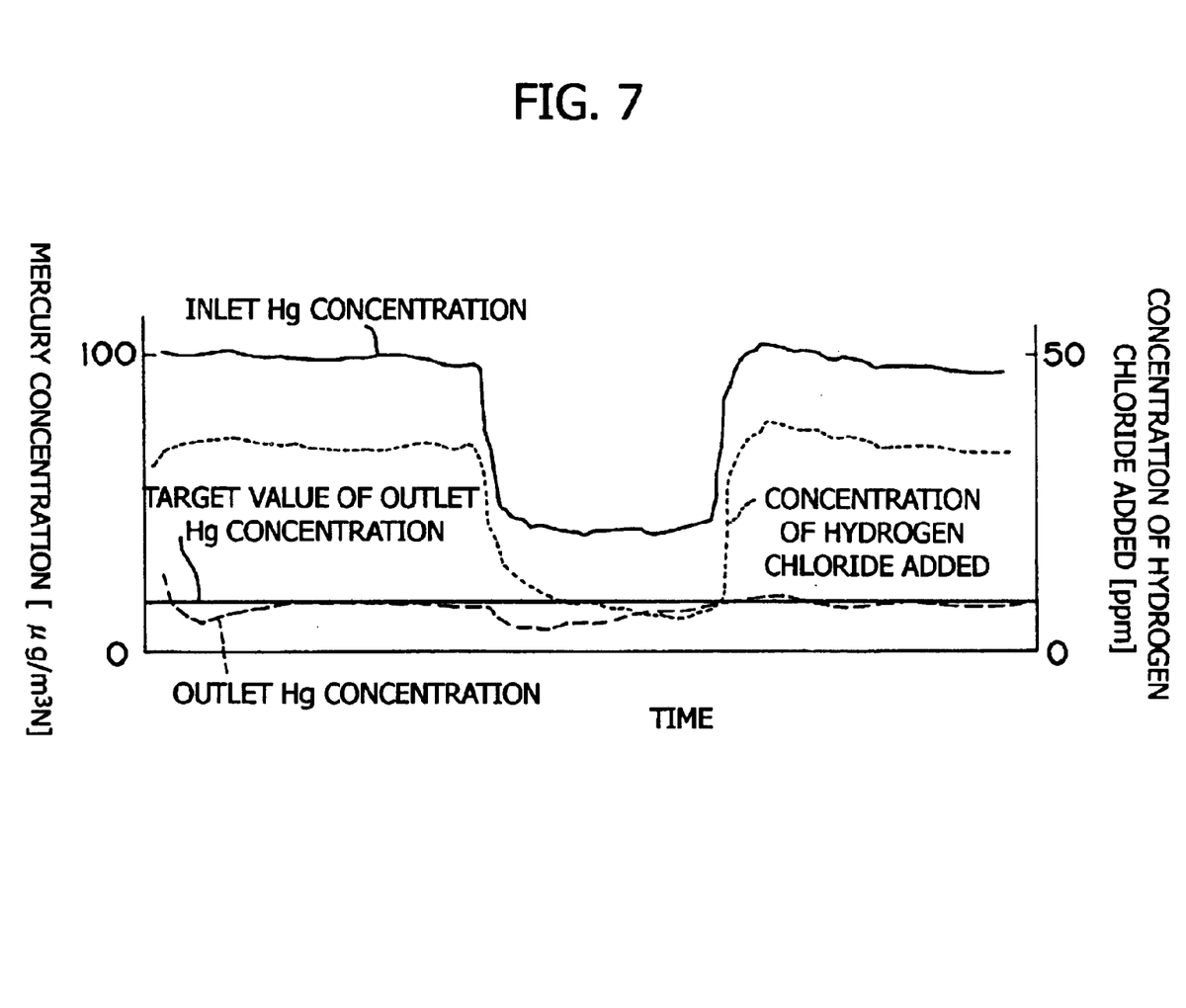
FIG. 7 is a diagram showing the conditions employed and the results of measurement obtained when the system of FIG. 5 was used in Example 1.
Figure 8:
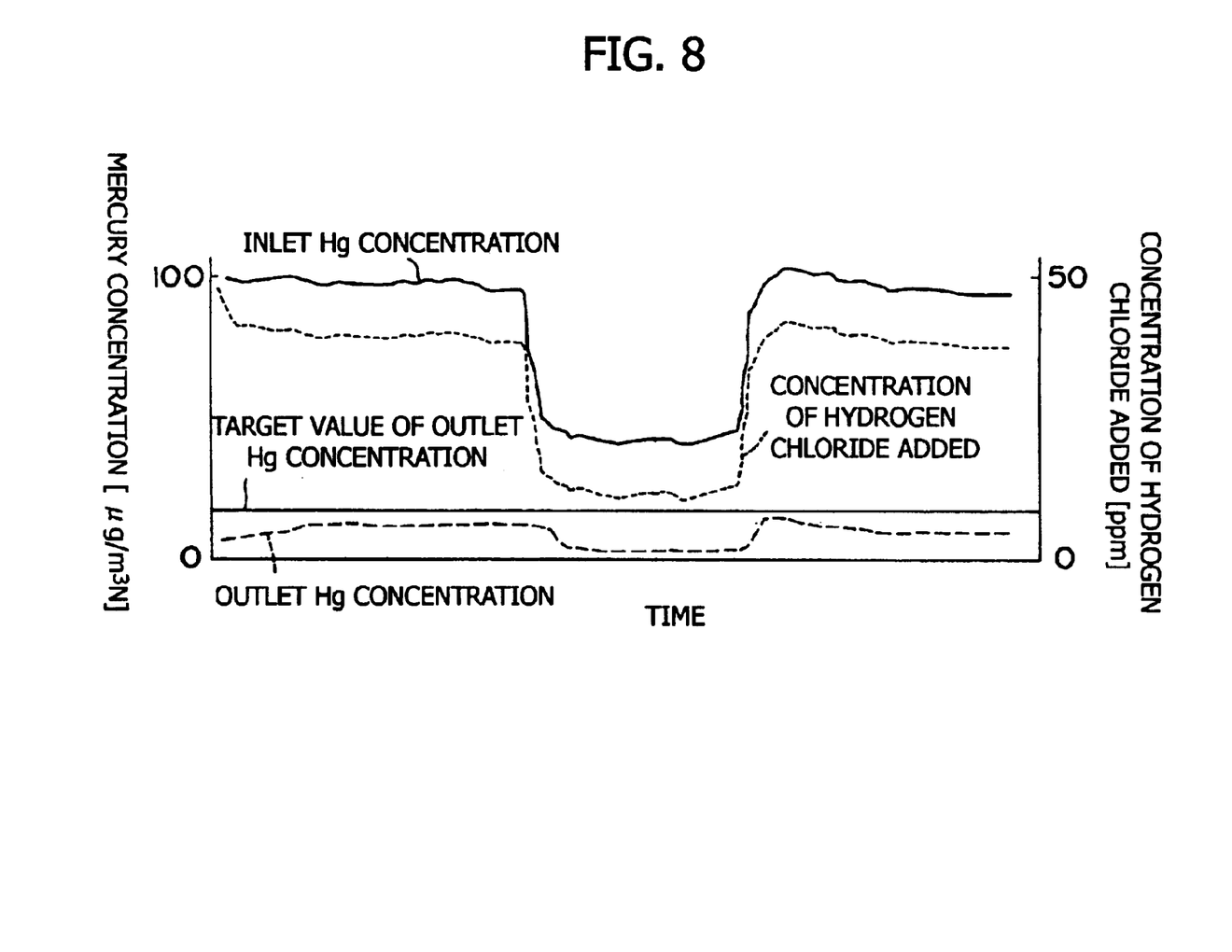
FIG. 8 is a diagram showing the conditions employed and the results of measurement obtained when the system of FIG. 6 was used in Example 1.

Moreover, the results obtained under the same conditions when the system of FIG. 5 in accordance with the second embodiment was used are shown in FIG. 7, and the results obtained under the same conditions when the system of FIG. 6 in accordance with the third embodiment was used are shown in FIG. 8.

While the present invention has been described with reference to several embodiments and examples, it is to be understood that they are disclosed in order to facilitate the understanding of the invention and are in no way intended to limit the scope of the invention.

What is claimed is:

1. A method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas after the wet desulfurization; calculating a predicted value of the inlet mercury concentration before the reductive denitration treatment on the basis of the measured mercury concentration; and controlling the feed rate of the chlorinating agent added prior to the reductive denitration treatment, according to the deviation of the predicted value from a reference inlet mercury concentration.

2. A method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas before the wet desulfurization; calculating a predicted value of the outlet mercury concentration after the wet desulfurization on the basis of the measured mercury concentration; and controlling the feed rate of the chlorinating agent added prior to the reductive denitration treatment, according to the deviation of the predicted value from a reference outlet mercury concentration.

3. A method for the treatment of mercury present in exhaust gas wherein, after a chlorinating agent is added to exhaust gas containing nitrogen oxides, sulfur oxides and mercury, the exhaust gas is subjected to a reductive denitration treatment in the presence of a solid catalyst and then to wet desulfurization using an alkaline absorbing fluid, the method being characterized by measuring the mercury concentration in the exhaust gas before and after the wet desulfurization; and controlling the feed rate of the chlorinating agent added prior to the reductive denitration treatment, according to the deviation of each of the measured mercury concentrations from a reference mercury concentration.

4. A system for the treatment of exhaust gas wherein, after a chlorinating agent is added to exhaust gas containing nitrogen oxides, sulfur oxides and mercury by means of a chlorinating agent feeding device, the exhaust gas is subjected to a denitration treatment in the presence of a solid catalyst of a reductive denitrator and then to desulfurization using an alkaline absorbing fluid within a wet desulfurizer, the system being characterized in that a mercury concentration meter is provided on the downstream side of the wet desulfurizer, and a flow rate control signal from an arithmetic unit and a controller connected to the mercury concentration meter is sent to the chlorinating agent feeding device.

* * * * *